United States Patent
Koenig et al.

(10) Patent No.: US 9,206,552 B2
(45) Date of Patent: Dec. 8, 2015

(54) ABSORBENT PLASTIC PIGMENT WITH IMPROVED PRINT DENSITY CONTAINING AND RECORDING SHEET CONTAINING SAME

(75) Inventors: Michael F. Koenig, Paducah, KY (US); Timothy J. Bradford, Killen, AL (US)

(73) Assignee: INTERNATIONAL PAPER COMPANY, Memphis, TN (US)

( * ) Notice: Subject to any disclaimer, the term of this patent is extended or adjusted under 35 U.S.C. 154(b) by 673 days.

(21) Appl. No.: 13/399,162

(22) Filed: Feb. 17, 2012

(65) Prior Publication Data

US 2013/0215184 A1  Aug. 22, 2013

(51) Int. Cl.
| | |
|---|---|
| B41M 5/50 | (2006.01) |
| D21H 19/32 | (2006.01) |
| C08F 291/00 | (2006.01) |
| D21H 17/33 | (2006.01) |
| D21H 17/45 | (2006.01) |
| D21H 19/42 | (2006.01) |
| C08F 265/06 | (2006.01) |
| C08F 283/00 | (2006.01) |
| C09D 151/00 | (2006.01) |

(52) U.S. Cl.
CPC .......... *D21H 19/32* (2013.01); *B41M 5/50* (2013.01); *C08F 265/06* (2013.01); *C08F 283/00* (2013.01); *C08F 291/00* (2013.01); *C09D 151/00* (2013.01); *D21H 17/33* (2013.01); *D21H 17/45* (2013.01); *D21H 19/42* (2013.01)

(58) Field of Classification Search
CPC .......... B41J 2/015; B41M 5/50; B41M 5/502; C08F 2/22; C08F 2/223; C08F 291/00; C08F 283/00; C08F 265/06; D21H 19/32; D21H 19/42; D21H 17/33; D21H 17/45; C09D 151/00; C08L 2207/05; C08L 2207/53
USPC .............. 347/95, 101, 102; 162/168.1–168.3, 162/181.2; 428/32.3, 32.36; 523/201, 206
See application file for complete search history.

(56) References Cited

U.S. PATENT DOCUMENTS

| | | |
|---|---|---|
| 2,816,874 A | 12/1957 | Schmutzler |
| 3,582,464 A | 6/1971 | Aldrich |
| 3,615,972 A | 10/1971 | Morehouse, Jr. et al. |
| 3,864,181 A | 2/1975 | Wolinski et al. |
| 3,966,654 A | 6/1976 | Aldrich |
| 4,006,273 A | 2/1977 | Wolinski et al. |
| 4,017,431 A | 4/1977 | Aldrich |
| 4,022,965 A | 5/1977 | Goheen et al. |
| 4,044,176 A | 8/1977 | Wolinski et al. |
| 4,075,136 A | 2/1978 | Schaper |
| 4,166,894 A | 9/1979 | Schaper |
| 4,174,417 A | 11/1979 | Rydell |
| 4,263,182 A | 4/1981 | Aldrich |
| 4,427,836 A | 1/1984 | Kowalski et al. |
| 4,431,481 A | 2/1984 | Drach et al. |
| 4,496,427 A | 1/1985 | Davison |
| 4,554,181 A | 11/1985 | Cousin et al. |
| 4,722,943 A | 2/1988 | Melber et al. |
| 4,829,094 A | 5/1989 | Melber et al. |
| 4,835,212 A | 5/1989 | Degen et al. |
| 4,855,343 A | 8/1989 | Degen et al. |
| 4,880,465 A | 11/1989 | Loria et al. |
| 4,986,882 A | 1/1991 | Mackey et al. |
| 5,049,235 A | 9/1991 | Barcus et al. |
| 5,157,084 A | 10/1992 | Lee et al. |
| 5,160,789 A | 11/1992 | Barcus et al. |
| 5,209,953 A | 5/1993 | Grupe et al. |
| 5,266,250 A | 11/1993 | Kroyer |
| 5,358,998 A | 10/1994 | Wendel et al. |
| 5,360,420 A | 11/1994 | Cook et al. |
| 5,443,899 A | 8/1995 | Barcus et al. |
| 5,531,728 A | 7/1996 | Lash |
| 5,639,805 A | 6/1997 | Park et al. |
| 5,662,773 A | 9/1997 | Frederick et al. |
| 5,667,637 A | 9/1997 | Jewell et al. |
| 5,685,815 A | 11/1997 | Bottorff et al. |
| 5,698,074 A | 12/1997 | Baracus et al. |
| 5,698,688 A | 12/1997 | Smith et al. |
| H1704 H | 1/1998 | Wallajapet et al. |
| 5,731,080 A | 3/1998 | Cousin et al. |
| 5,814,685 A | 9/1998 | Satake et al. |
| 6,146,494 A | 11/2000 | Seger et al. |
| 6,171,285 B1 | 1/2001 | Johnson |
| 6,207,258 B1 | 3/2001 | Varnell |
| 6,361,651 B1 | 3/2002 | Sun |
| 6,379,497 B1 | 4/2002 | Sandstrom et al. |

(Continued)

FOREIGN PATENT DOCUMENTS

| | | |
|---|---|---|
| EP | 0364629 | 4/1990 |
| EP | 0629741 | 12/1994 |
| EP | 0666368 | 8/1995 |
| EP | 1582370 | 10/2005 |
| WO | 9745590 | 12/1997 |
| WO | 2006026283 | 3/2006 |
| WO | 2008067444 | 6/2008 |
| WO | 2008156519 | 12/2008 |
| WO | 2009115831 | 9/2009 |

*Primary Examiner* — Matthew Luu
*Assistant Examiner* — Rut Patel
(74) *Attorney, Agent, or Firm* — Thomas W. Barnes, III

(57) ABSTRACT

A core/shell particle is provided, comprising: a water-absorbent, dye-fixing polymeric core, comprising: (a) a multivalent cation and a polymerization product of a monoethylenically unsaturated carbonyl-group containing monomer; (b) a nitrogen-containing polymer; or (c) a combination of (a) and (b); and a water-insoluble, porous polymeric shell, surrounding all or a portion of said core. A paper sizing or coating composition which incorporates the core/shell particles is provided. Recording sheets which include the composition, methods of making the composition and recording sheets, and methods for making an image are provided.

10 Claims, No Drawings

(56) References Cited

U.S. PATENT DOCUMENTS

| | | |
|---|---|---|
| 6,417,249 B1 | 7/2002 | Nguyen et al. |
| 6,471,824 B1 | 10/2002 | Jewell |
| 6,485,139 B1 | 11/2002 | Lavery et al. |
| 6,506,282 B2 | 1/2003 | Hu et al. |
| 6,579,414 B2 | 6/2003 | Jewell |
| 6,579,415 B2 | 6/2003 | Jewell |
| 6,582,557 B2 | 6/2003 | Jewell |
| 6,592,712 B2 | 7/2003 | Koukoulas et al. |
| 6,592,717 B2 | 7/2003 | Jewell |
| 6,617,364 B2 | 9/2003 | Soane et al. |
| 6,686,054 B2 | 2/2004 | Nigam |
| 6,693,466 B2 | 2/2004 | Inoue et al. |
| 6,761,977 B2 | 7/2004 | Nigam |
| 6,764,726 B1 | 7/2004 | Yang et al. |
| 7,151,131 B2 | 12/2006 | Kenworthy et al. |
| 7,157,504 B2 | 1/2007 | Ma et al. |
| 7,253,216 B2 | 8/2007 | Miyabayashi |
| 7,377,630 B2 | 5/2008 | Doi |
| 7,744,205 B2 | 6/2010 | Sarkisian et al. |
| 2001/0044477 A1 | 11/2001 | Soane et al. |
| 2003/0008931 A1 | 1/2003 | Soane et al. |
| 2003/0008932 A1 | 1/2003 | Soane et al. |
| 2004/0065423 A1 | 4/2004 | Swerin et al. |
| 2004/0123966 A1 | 7/2004 | Altman et al. |
| 2004/0157057 A1 | 8/2004 | Tasaki et al. |
| 2004/0176554 A1* | 9/2004 | Ishida ............... 526/242 |
| 2004/0244928 A1 | 12/2004 | Huang et al. |
| 2006/0102307 A1 | 5/2006 | Kron et al. |
| 2008/0035292 A1 | 2/2008 | Singh et al. |
| 2008/0064786 A1 | 3/2008 | Tanaka et al. |
| 2008/0311416 A1 | 12/2008 | Kelly et al. |
| 2009/0297738 A1* | 12/2009 | Song et al. ............ 428/32.3 |
| 2010/0063171 A1 | 3/2010 | Roschmann et al. |
| 2011/0151149 A1* | 6/2011 | Koenig ............ 428/32.19 |

\* cited by examiner

ABSORBENT PLASTIC PIGMENT WITH IMPROVED PRINT DENSITY CONTAINING AND RECORDING SHEET CONTAINING SAME

BACKGROUND

1. Field of the Invention

The invention relates to core/shell particles and recording sheets using same.

2. Discussion of the Background

Absorbent plastic pigments are currently used for ink jet coatings. The plastic pigments are hollow plastic pigment shells. The shell is typically water insoluble but porous. They may have a water absorbent inner core, or may be hollow. These microspheres improve drying qualities, but do not have a large effect on ink density in the printed article.

The inventors have discovered and solved the aforementioned problems and provide herein a composition and recording sheet that is suitable for a variety of printing applications, for example liquid toner EP (electrophotographic) printing, dry toner EP printing, inkjet printing, offset printing, laser printing, gravure printing, flexo coating printing, and others.

SUMMARY

Quite surprisingly, the present inventors have found that it is possible to provide a core/shell particle, in which an absorbent polymer forming the core portion may contain or be modified to contain a dye fixative, which allows the plastic particle to absorb more colorant. In one embodiment, one or more dye fixative is added to the polymer core so that when printed, the colorant, such as an ink, dye, or pigment, will become attached to the absorbent inner core and cannot diffuse back out. This should increase the print density of a coating which contains the core/shell particles, particularly in inkjet printing applications.

DETAILED DESCRIPTION OF THE SEVERAL EMBODIMENTS

The above advantages, and others, are obtained with the present invention. Compared to conventional or commercially available recording sheets, the present invention enables and/or achieves excellent print density.

One embodiment provides a core/shell particle, comprising:

a water-absorbent, dye-fixing core polymer, comprising:

(a) a multivalent cation and a polymerization product of a monoethylenically unsaturated carbonyl-group containing monomer;

(b) a nitrogen-containing polymer; or (c) a combination of (a) and (b); and a water-insoluble, porous polymeric shell, surrounding all or a portion of said core.

The composition may be advantageously utilized in a variety of formulations, coatings, and applications. For example, the composition is suitable for a variety of printing applications, for example liquid toner EP (electrophotographic) printing, dry toner EP printing, inkjet printing, offset printing, laser printing, gravure printing, flexo coating printing, and others. In one embodiment, the core/shell particle is suitable for addition into currently known formulations for inkjet, offset, laser, gravure, and flexo coatings, for example. In one embodiment, conventional coatings can be made into multipurpose coatings by the addition of the core/shell particle.

In one embodiment, the core/shell particle is less abrasive than silica or alumina and thus may be advantageously utilized for multipurpose papers. In such an embodiment, the core/shell particles desirably results in less wear on toner fusers, offset blankets, and the like. In one embodiment, the core/shell particle may be suitable as a replacement for silica or alumina in photo quality inkjet coatings, as a blend with GCC, PCC, and/or clay to enhance the inkjet printability of low quality and inexpensive inkjet coatings, as a pigment either by itself or with clay, silica, and/or alumina and other non-soluble pigments and binders for the printing of books. In one embodiment, the core/shell particle and/or binder resin would be non-soluble in acidic, basic, or neutral highlighter fluid, which would desirably prevent highlighter smear of printed text or images, especially those printed with inkjet printers.

In one embodiment, the polymerization product comprises a homopolymer of a monoethylenically unsaturated carbonyl-group containing monomer.

In one embodiment, the polymerization product comprises a copolymer of two or more different monoethylenically unsaturated carbonyl-group containing monomers.

In one embodiment, the monoethylenically unsaturated carbonyl-group containing monomer comprises a group of the formula $H_2C=C<$ and one or more of a carboxylic acid, ester thereof, anhydride thereof, carboxylate, or a combination thereof.

The core polymer may be the product of aqueous emulsion polymerization of one or more monoethylenically unsaturated monomers containing a group of the formula $H_2C=C<$ and a carboxylic acid group. Exemplary acid monomers include acrylic acid, methacrylic acid, (meth)acryloxypropionic acid, itaconic acid, aconitic acid, maleic acid or anhydride, fumaric acid, crotonic acid, monomethyl maleate, monomethyl fumarate, monomethyl itaconate, and combinations thereof.

The core polymer may be obtained by the emulsion homopolymerization of such an acid monomer or by copolymerization of two or more acid monomers. In one embodiment, an acid monomer or a mixture of acid monomers is copolymerized with one or more ethylenically unsaturated monomers of non-ionic character (that is, having no ionizable group) having one or more ethylenically unsaturated groups of the formula $H_2C=C<$.

Exemplary acid monomers that may be used in providing an alkali-swellable core are acrylic acid and methacrylic acid and mixtures thereof; other exemplary acid monomers that may be used include acryloxypropionic acid, methacryloxypropionic acid, acryloxyacetic acid, methacryloxyacetic acid, monomethyl acid itaconate, and combinations thereof.

Examples of nonionic monoethylenically unsaturated monomers include styrene, vinyltoluene, ethylene, vinyl acetate, vinyl chloride, vinylidene chloride, acrylonitrile, (meth)acrylamide, various $(C_1-C_{20})$alkyl or $(C_3-C_{20})$alkenyl esters of (meth)acrylic acid, (The expression (meth)acrylic acid is intended to serve as a generic expression embracing both acrylic acid and methacrylic acid.) e.g., methyl methacrylate, methyl acrylate, ethyl(meth)acrylate, butyl(meth)acrylate, 2-ethylhexyl(meth)acrylate, benzyl(meth)acrylate, lauryl(meth)acrylate, oleyl(meth)acrylate, palmityl(meth)acrylate, and stearyl(meth)acrylate.

The amount of core polymers containing acid mers is not particularly limited, and may suitably range from greater than zero to 50 percent based on the total weight of core-producing monomer mixture. This range includes all values and subranges therebetween, including greater than zero, 1, 2, 3, 4, 5, 6, 7, 8, 9, 10, 15, 20, 25, 30, 35, 40, 45, 50 weight percent, or any combination thereof. In one embodiment, core copolymers containing at least about 5% by weight of acid mers are used. In another embodiment, core polymers containing at least 10% by weight of acid mers are used. In one embodiment, the core polymers contain acid mers such that the core is swellable. In another embodiment, due to the hydrophobicity of certain comonomers or combinations thereof in conjunction with the hydrophobic/hydrophilic balance of a particular acid monomer, the copolymer may require somewhat less than 5 weight percent of acid monomer or considerably more than 5 weight percent thereof. In the latter instance the proportion of acid monomer may be at least 10 weight percent based on the total weight of core-producing monomer mixture. In one embodiment, e.g., homopolymerization of an acid monomer core, the core polymer may suitably contain 100% of the addition polymerizable carboxylic acid. In one embodiment, a maximum quantity of acid monomer in the core polymer is about 70% of the total core monomers, by weight.

In one embodiment, the core polymer may comprise as one component thereof a small amount of a polyethylenically unsaturated monomer, such as ethylene glycol di(meth)acrylate, allyl(meth)acrylate, 1,3-butane-diol di(meth)acrylate, diethylene glycol di(meth)acrylate, trimethylol propane trimethacrylate, divinyl benzene, or combination thereof. The proportion thereof in one embodiment is in the range of about 0.1% to 20%, based on the total monomer weight of the core, which includes all values and subranges therebetween, including 0.1, 0.2, 09.3, 0.4, 0.5, 0.6, 0.7, 0.8, 0.9, 1, 2, 3, 4, 5, 6, 7, 8, 9, 10, 15, 20%, or any combination thereof based on the total monomer weight of the core. In one embodiment, the amount used may be approximately directly proportional to the amount of acid monomer used. In one embodiment, the amount of polyethylenically unsaturated monomer is about 0.1% to about 3%, by weight. In one embodiment, butadiene is exceptional in that it often functions as a monoethylenically unsaturated monomer especially in mixtures with styrene so the amount of butadiene, if used, may be as much as 30 to 60 percent by weight of the total core monomer weight.

In one embodiment, the core/shell particle may be made via multistage sequential emulsion polymerization. The term "seed" polymer is sometimes used to refer to an aqueous emulsion polymer dispersion which may be the initially-formed dispersion, that is the product of a single stage of emulsion polymerization or it may be the emulsion polymer dispersion obtained at the end of any subsequent stage except the final stage of the sequential polymerization. Thus, an alkali-swellable polymer which is herein intended to be provided with a shell by one or more subsequent stages of emulsion polymerization may itself be termed a seed polymer for the next stage wherein the shell-forming polymer is deposited on such seed polymer particles.

While the core may be made in a single stage or step of the sequential polymerization and the shell may be the product of a single sequential stage or step following the core stage, nevertheless, the making of the core component may involve a plurality of steps in sequence followed by the making of the shell which may involve a series of sequential steps as well.

Thus, in one embodiment, the first stage of emulsion polymerization may be the preparation of a seed polymer containing small dispersed polymer particles insoluble in the aqueous emulsion polymerization medium. This seed polymer may or may not contain any acid component but provides particles of minute size which form the nuclei on which the core polymer of acid monomer, with or without nonionic comonomer(s), is formed.

As is common to aqueous emulsion polymers, there is used a water-soluble free radical initiator, such as hydrogen peroxide, tert-butyl peroxide, or an alkali metal (sodium, potassium or lithium) or ammonium persulfate or a mixture of such an initiator with a reducing agent, such as a sulfite, more specifically an alkali metal metabisulfite, hydrosulfite, or hyposulfite, or sodium formaldehyde sulfoxylate, to form a redox system. The amount of initiator may be from 0.01 to about 2% by weight of the monomer charged and in a redox system, a corresponding range (0.01 to about 2%) of reducing agent may be used. The temperature may be in the range of about 10° C. to 100° C. In the case of the persulfate systems, the temperature is preferably in the range of 60° to 90° C. In the redox system, the temperature is preferably in the range of 30° to 70° C., preferably below about 60° C., more preferably in the range of 30°-45° C. The proportion of emulsifier may be zero, in the situation wherein a persulfate initiator is used, to about 0.3 weight percent, based on the weight of monomer charged to the first stage of polymerization. By carrying out the emulsion polymerization while maintaining low levels of emulsifier, the subsequent stages of polymer-formation deposit the most-recently formed polymer on the existing dispersed polymer particles resulting from the preceding step or stage. As a general rule, the amount of emulsifier should be kept below that corresponding to the critical micelle concentration for a particular monomer system, but while this limitation is preferable and produces a unimodal product, it has been found that in some systems the critical micelle concentration of the emulsifier may be exceeded somewhat without the formation of an objectionable or excessive number of dispersed micelles or particles. It is for the purpose of controlling the number of micelles during the various stages of polymerization so that the deposition of the subsequently formed polymer in each stage occurs upon the dispersed micelles or particles formed in the previous stages, that the concentration of emulsifier is kept low. However, as pointed out hereinabove, polymodal products may be obtained by including an emulsifier or surfactant in one or more of the later monomer charges.

Any nonionic or anionic emulsifier may be used, either alone or together. Examples of the nonionic type of emulsifier include tert-octylphenoxyethylpoly(39)-ethoxyethanol, and nonylphenoxyethylpoly(40)ethoxyethanol. Examples of anionic emulsifiers include sodium lauryl sulfate, sodium dodecyl benzene sulfonate, tertoctylphenoxyethoxypoly(39) ethoxyethyl sulfate, sodium salt.

In one embodiment, the molecular weight of the core polymer formed in a given stage may range from 100,000, or lower if a chain transfer agent is used, to several million viscosity average. When 0.1 to 20 weight % of a polyethylenically unsaturated monomer mentioned hereinbefore is used in making the core polymer, sometimes referred to herein as the acid polymer, the molecular weight is increased whether or not crosslinking occurs. The use of the polyethylenically unsaturated monomer reduces the tendency of the core polymer to dissolve when the core/shell polymer is treated with a swellant for the core. In one embodiment, e.g., wherein it is desired to produce an acid polymer having a molecular weight in the lower part of the range, such as from 500,000 down to as low as about 20,000, the polyethylenically unsaturated monomers may be avoided, and instead use a chain transfer agent, such as 0.05 to 2% or more thereof, examples being a lower alkyl mercaptan, such as sec-butyl mercaptan.

The average size of the acid-containing core polymer, whether obtained by a single stage process or a process involving several stages, is not particularly limited. In one embodiment, the core polymer has an average size ranging from about 0.02 to about 2.0 microns in diameter, which range includes all values and subranges therebetween, including 0.02, 0.05, 0.07, 0.1, 0.2, 0.3, 0.4, 0.5, 06, 0.7, 0.8, 0.9, 1, 1.2, 1.5, 1.7, 2 microns, or any combination thereof. In one embodiment, the core polymer has an average size of about 0.05 to about 1.0 microns. In another embodiment, the core polymer has an average size of about 0.1 to 0.5 microns. In another embodiment, the core polymer has an average size of about 0.2 to 0.5 micron diameter in unswollen condition. If the core is obtained from a seed polymer, whether or not the latter contains acid groups or mers, the seed polymer may have an average size in the range of 0.03 to 0.2 micron diameter, which includes all values and subranges therebetween, for example, 0.03, 0.04, 0.05, 0.06, 0.07, 0.08, 0.09, 0.1, 0.2 micron diameter, or any combination thereof. In one embodiment, the nitrogen-containing polymer (b) may be used as a seed polymer.

Examples of nitrogen-containing core polymers include polyvinylpyridine, polyalkylaminoethyl acrylate, polyalkylaminoethyl methacrylate, poly(vinyl imidazole), polyethyleneimine, polybiguanide, polyguanide, poly(hexamethylene)biguanide (PHMB), polyvinylamine, polydiallyldimethylammonium chloride, polydicyanoguanide, polyallylamine, polyacrylamine, polyacrylamide, polyquaternaryamine, cationic polyurethane, aminocellulose, polysaccharide amine, or combination thereof. In one embodiment, the nitrogen-containing core polymer is cationic. The nitrogen-containing core polymer may be made according to methods known in the polymer arts. Examples of nitrogen-containing polymers and methods of making may be found in U.S. Pat. Nos. 7,151,131, 7,157,504, 6,693,466, and 6,485,139, the entire contents of each of which being hereby incorporated by reference.

In one embodiment, the core polymer may include both the acid polymer mentioned heretofore and the nitrogen-containing polymer. In one embodiment, the core may include a blend of each, or a compolymer of each, or a combination thereof.

After the acid core is obtained, a subsequent stage or stages of emulsion polymerization is effected to form a shell polymer on the acid core polymer particles or micelles. This may be performed in the same reaction vessel in which the formation of the core was accomplished or the reaction medium containing the dispersed core particles may be transferred to another reaction container. It is generally unnecessary to add emulsifier unless a polymodal product is desired, but in certain monomer/emulsifier systems for forming the shell, the tendency to produce gum or coagulum in the reaction medium may be reduced or prevented by the addition of about 0.05 to about 0.5% by weight, based on shell-forming monomer weight, of emulsifier without detriment to the deposition of the polymer formed on the previously formed core particles.

The monomers used to form the shell polymer on the acid core particles may be any of the nonionic monoethylenically unsaturated comonomers mentioned hereinbefore for the making of the core. The monomers used and the relative proportions thereof in any copolymers formed should be such that the shell thereby formed is permeable to water, an aqueous solution, and/or an aqueous basic swellant for the acid core. In one embodiment, non-polar or low-polar monomers, namely, styrene, α-methyl styrene, vinyl toluene, ethylene, vinyl chloride and vinylidene chloride are useful alone (except in the first stage of shell formation) or in admixture with more highly polar monomers in the list, such as vinyl acetate. Monomeric mixtures for making the shell may contain up to about 20% by weight of an acid monomer, such as one of the monomeric acids mentioned hereinbefore for making the core. This range includes all values and subranges therebetween, including 0, 0.1, 0.5, 1, 2, 3, 4, 5, 6, 7, 8, 9, 10, 15, 20%, by weight of acid monomer or any combination thereof. However, the proportion of acid in the shell polymer should not exceed one-third the proportion thereof in the core polymer. The content of acid monomer serves either or both of two functions, namely stabilization of the final sequential polymer dispersion and assuring permeability of the shell to water, an aqueous solution, or an aqueous base swellant for the core. Examples of core/shell particles and methods for making may be found in U.S. Pat. No. 4,427,836, the entire contents of which being already incorporated by reference.

The amount of polymer deposited to form shell polymer is generally such as to provide an overall size of the core/shell polymer particle of about 0.05 to about 5 microns, which range includes all values and subranges therebetween, including 0.05, 0.07, 0.09, 1, 1.5, 2, 2.5, 3, 3.5, 4, 4.5, 5 microns, or any combination thereof. In one embodiment, the core/shell particle has an average size of about 0.07 to 5.5 microns. In one embodiment, the average size is about 0.1 to about 3.5 microns. In one embodiment, the average size is about 0.2 to about 2.0 microns. In one embodiment, the size is measured in the unswollen condition (that is, before any neutralization to raise the pH to about 6 or higher) whether the shell polymer is formed in a single stage or in a plurality of stages. In unswollen state, the ratio of core weight to the total weight on average is not particularly limited. In one embodiment, it may range from 1:4 to 1:100, which includes all values and subranges therebetween, including 1:4, 5, 6, 7, 8, 9, 10, 20, 30, 40, 50, 60, 70, 80, 90, 100, or any combination thereof. In one embodiment, the ratio of core weight to the total weight on average ranges from 1:8 to 1:50. In one embodiment, core contains one or more voids, which may be produced according to known methods.

The term, "porous" referring to the shell, means that the shell is permeable to liquids, e.g., water, aqueous solutions, basic aqueous solutions, solutions containing the multivalent cation, organic liquids, and the like. In one embodiment, the term refers to a physical structure wherein the shell contains pores.

In the case wherein the core includes the polymerization product of a monoethylenically unsaturated carbonyl-group containing monomer (sometimes referred to herein as the acid core), the manner in which the multivalent cation in (a) is incorporated into the core is not particularly limited. The multivalent cation may be suitably introduced to the polymer in accordance with known methods. For example, the multivalent cation may be present in the form of a salt, ionically bound to the polymer, e.g., the carboxylic acid moieties before, during, or after the polymerization of the core. In another embodiment, it may be introduced into the core after the core is polymerized, for example, by contacting the core polymer with a basic solution of the multivalent cation and forming the salt. In another embodiment, the core/shell particle may be contacted with a basic solution of the multivalent cation, which penetrates the shell and swells the core and, when the solution is withdrawn, the multivalent cation remains in the core portion. In one embodiment, the multivalent cation is not present in the shell portion at all. In another embodiment, the shell portion may contain a small amount or residual amount of multivalent cation. In one embodiment, the multivalent cation is present in the core in the form of a salt of a carboxylate moiety of the core polymer. In one embodiment, the core/shell particle containing the acid core is swollen when the particles are subjected to an aqueous basic swellant that permeates the shell and expands the core, which expansion may involve partial merging of the outer periphery of the core into the pores of the inner periphery of the shell and also partial enlargement or bulging of the shell and the entire particle overall. When the swellant is removed by drying, the shrinkage of the core may develop a microvoid, and the multivalent cation may be present in the microvoids, the extent of which may depends on the resistance of the shell to restoration to its previous size. Suitable swelling agents for acid-containing cores are ammonia, ammonium hydroxide, or a volatile lower aliphatic amine, such as trimethylamine, and triethylamine.

In one embodiment, the multivalent cation may be in form of a basic solution of calcium, aluminum, zirconium, zinc, titanium, magnesium, barium, water soluble salt thereof, or combination thereof, and contacted with the core polymer, the core particle, or the core/shell particle. In one embodiment, the basic solution is sufficiently basic such that the multivalent cation forms a salt with the carboxylate of the core polymer.

In one embodiment, the polymerization product comprises a copolymer of a monoethylenically unsaturated carbonyl-group containing monomer and a polyethylenically unsaturated monomer.

In one embodiment, the polymerization product is an emulsion polymerization product.

In one embodiment, the multivalent cation comprises one or more of calcium, aluminum, zirconium, zinc, titanium, magnesium, barium, salt thereof, water soluble salt thereof, or combination thereof.

In one embodiment, the core particle (a) comprises a salt of the multivalent cation and the polymerization product.

In one embodiment, the core particle (a) comprises a water-soluble salt of the multivalent cation and the polymerization product.

The core/shell particle is particularly suitable for inclusion in paper products. In one embodiment, the core/shell particle is applied in a sizing or coating composition to a web to form a paper substrate, e.g., an sized or coated paper substrate. In one embodiment, the paper substrate may contain from 0.001 to 30 wt % of the core/shell particles based on the total weight of the substrate. This range includes all values and subranges therebetween, including 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 15, 20, 25, 30, weight percent, or any combination thereof, based on the total weight of the substrate.

In one embodiment, the core/shell particle does not contain a colorant, such as an ink or dye or pigment in the core. In one embodiment, the core/shell particle does not contain a colorant, such as an ink or dye or pigment in the shell.

One embodiment provides a method, comprising:
  forming a core particle by:
    (i) polymerizing a nitrogen-containing monomer to form a nitrogen-containing polymer, and/or
    (ii) polymerizing a monoethylenically unsaturated carbonyl-group containing monomer to form a polymerization product;
  forming a water-insoluble, porous polymeric shell around all or a portion of the core particle; and
  contacting, in any order, the polymerization product with a multivalent cation;
  to form a core/shell particle, comprising:
    a water-absorbent, dye-fixing core polymer, comprising:
      (a) the multivalent cation and the polymerization product;
      (b) the nitrogen-containing polymer; or
      (c) a combination of (a) and (b); and
    the water-insoluble, porous polymeric shell, surrounding all or a portion of the core polymer.

One embodiment relates to a sizing or coating composition, comprising:
  a core/shell particle, comprising:
    a water-absorbent, dye-fixing core polymer, comprising:
      (a) a multivalent cation and a polymerization product of a monoethylenically unsaturated carbonyl-group containing monomer;
      (b) a nitrogen-containing polymer; or
      (c) a combination of (a) and (b); and
    a water-insoluble, porous polymeric shell, surrounding all or a portion of said core;
  a binder resin; and
  a carrier liquid.

Another embodiment relates to a method for making a sizing or coating composition, comprising contacting, in any order:
  a core/shell particle, comprising:
    a water-absorbent, dye-fixing core polymer, comprising:
      (a) a multivalent cation and a polymerization product of a monoethylenically unsaturated carbonyl-group containing monomer;
      (b) a nitrogen-containing polymer; or
      (c) a combination of (a) and (b); and
    a water-insoluble, porous polymeric shell, surrounding all or a portion of said core;
  a binder resin; and
  a carrier liquid.

Another embodiment relates to a method for making a recording sheet, comprising contacting a fibrous web with a sizing or coating composition, comprising:
  a core/shell particle, comprising:
    a water-absorbent, dye-fixing core polymer, comprising:
      (a) a multivalent cation and a polymerization product of a monoethylenically unsaturated carbonyl-group containing monomer;
      (b) a nitrogen-containing polymer; or
      (c) a combination of (a) and (b); and
    a water-insoluble, porous polymeric shell, surrounding all or a portion of said core;
  a binder resin; and
  a carrier liquid;
  and drying.

Another embodiment relates to a recording sheet, comprising:
  a paper substrate having a coating or sizing, the coating or sizing comprising:
    a core/shell particle, comprising:
      a water-absorbent, dye-fixing core polymer, comprising:
        (a) a multivalent cation and a polymerization product of a monoethylenically unsaturated carbonyl-group containing monomer;
        (b) a nitrogen-containing polymer; or
        (c) a combination of (a) and (b); and
      a water-insoluble, porous polymeric shell, surrounding all or a portion of said core;
    and a binder resin.

Another embodiment relates to a method for forming an image on a recording sheet, comprising forming an image with a printing apparatus on a surface of a recording sheet, the recording sheet comprising:
  a paper substrate having a coating or sizing, the coating or sizing comprising:
    a core/shell particle, comprising:
      a water-absorbent, dye-fixing core polymer, comprising:
        (a) a multivalent cation and a polymerization product of a monoethylenically unsaturated carbonyl-group containing monomer;

(b) a nitrogen-containing polymer; or
(c) a combination of (a) and (b); and
  a water-insoluble, porous polymeric shell, surrounding all or a portion of said core;
and a binder resin.

In one embodiment, the core/shell particle comprises a porous hydrophobic shell and a water-absorbent inner core.

In one embodiment, the inner core is made using acidic monomers such as acrylic acid, methacrylic acid, and the like, or their respective anhydrides or esters. The polymer core may be reacted with bases containing calcium, aluminum, zirconium, zinc, titanium, or other multivalent cations under suitable conditions to incorporate these multivalent cations into the inner core of the absorbent plastic pigment. The cations serve as dye fixatives for dye-based inks and as emulsion destabilizers for pigment-based inks, and so can trap either type of ink colorant within the inner core of the plastic pigment particle.

In another embodiment, the inner core is composed of nitrogen-containing polymers such as poly(hexamethylene biguanide) (PHMB), poly(DADMAC), dicyanoguanide resins (DICY), and other polymers commonly used as dye fixatives.

In another embodiment, the inner core is composed of a mixture of the above two embodiments.

In another embodiment, a size press or coating composition includes the core/shell particle, a binder resin, and a pigment particle such as a ground calcium carbonate (GCC), precipitated calcium carbonate (PCC), clay, and/or silica, or a combination thereof.

In another embodiment, a size press or coating composition includes the core/shell particle and a binder resin, wherein the binder resin may be one or more of starch, polyvinyl alcohol (PVOH), polyvinylpyrrolidone (PVP), latex, or a combination thereof.

In one embodiment, one or both of the inner core and outer shell may include crosslinkers to improve the water absorption, to reduce diffusion of the inner core polymers out of the outer shell, or to limit the swelling of the inner core polymers to prevent fracture of the outer shell.

In another embodiment, the nitrogen-containing polymers may be used to crosslink the acid-containing polymer, then reacting multivalent cations with the available sites on the acidic or nitrogen-containing polymers.

The sizing or coating composition includes a binder resin, which is not particularly limited. In one embodiment, the binder resin may be one or more of those commonly used in coating or sizing compositions to make paper suitable for liquid toner or liquid ink printing applications. Examples of liquid toner or liquid ink printing applications include INDIGO™ digital printing available from Hewlett-Packard, inkjet printing, continuous jet printing, drop-on-demand inkjet printing, liquid thermal/bubble jet printing, and the like. Binder resins which are compatible with liquid inks, liquid toner binders, and also liquid toner binders themselves, are known in the art or otherwise easily determined given the teachings herein combined with the knowledge of one of ordinary skill in the papermaking and/or liquid toner printing arts.

Non-limiting examples of the binder resin include one or more of a polyethylene acrylic acid copolymer, polyethylene methacrylic acid copolymer, polyethylene imine, polyvinyl alcohol, polyvinylpyrrolidone, latex, starch, or a combination thereof. Other examples of suitable binder resins are disclosed in U.S. Patent Application Publication No. 2004/0244928, the relevant contents of which are hereby incorporated by reference.

The amount of binder resin is not particularly limited. In one embodiment, the binder resin is present in the composition in an amount ranging from about 1 to 60 parts by weight, based on the total weight of the composition. This range includes all values and subranges therebetween, including about 1, 2, 3, 4, 5, 6, 7, 8, 9, 10, 12, 14, 16, 18, 20, 22, 24, 26, 28, 30, 35, 40, 45, 50, 55, 60 parts by weight, or any combination thereof.

The composition may optionally include a pigment, which is not particularly limited. Non-limiting examples of pigments include calcium carbonate, kaolin clay, calcined clay, aluminum trihydrate, titanium dioxide, talc, plastic pigment, ground calcium carbonate, precipitated calcium carbonate, amorphous silica, modified calcium carbonate, modified calcined clay, aluminum silicate, zeolite, aluminum oxide, silica, colloidal silica, colloidal alumina slurry, modified calcium carbonate, modified ground calcium carbonate, modified precipitated calcium carbonate, or a mixture thereof.

In one embodiment, non-limiting examples of the pigment include calcium carbonate, kaolin clay, calcined clay, aluminum trihydrate, titanium dioxide, talc, plastic pigment, or a mixture thereof.

In one embodiment, the calcium carbonate is ground calcium carbonate, precipitated calcium carbonate, or a mixture thereof.

In one embodiment, the modified calcium carbonate is modified ground calcium carbonate, modified precipitated calcium carbonate, or a mixture thereof. Here, the term, "modified" is sometimes referred to as "structured". These types of pigments are known to those skilled in the papermaking art.

If present, the amount of the pigment is not particularly limited. In one embodiment, the pigment is present in the composition in an amount ranging from about 1 to 75 parts by weight, based on the weight of the composition. This range includes all values and subranges therebetween, including 1, 2, 3, 4, 5, 6, 7, 8, 9, 10, 15, 20, 25, 30, 35, 40, 45, 50, 55, 60, 65, 70, and about 75 parts by weight, or any combination thereof.

The composition may be suitably used as a sizing composition or a coating composition or a combination thereof. If used as a coating on a substrate, the composition may be used as a base coat, a top coat, or both. The composition may be prepared at any point in the papermaking process. In one embodiment, the contacting is carried out at a size press.

When applied to a substrate, the composition may be present in an amount ranging from about 0.1 to 30 g/m$^2$ (gsm). This range includes all values and subranges therebetween, including 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30 g/m$^2$, or any combination thereof.

When applied to a substrate to produce a recording sheet, the composition may be applied as a single continuous layer. Alternatively, the composition may be applied sequentially as two or more sublayers.

In the case wherein the composition is comprised of two or more sublayers in contact with one another, each sublayer may or may not contain all of the core/shell particles. For example, a coating composition may include a first layer, which is in contact with the substrate and which contains the core/shell particles; and a second layer overlying and in contact with the first layer, which second layer may or may not contain core/shell particles.

Alternatively, when the composition is comprised of two or more sublayers, the first sublayer may lack any core/shell particles, and the second sublayer will contain the core/shell particles.

In one embodiment, the composition is present only as a single layer.

The composition may be applied to a single side of a substrate or to both sides.

The composition may be in the form of a mixture, solution, aqueous solution, emulsion, dispersion, latex, or colloidal composition. The term "emulsion" is used herein, as is customary in the art, to mean either a dispersion of the liquid-in-liquid type or of the solid-in-liquid type, as well as latex or colloidal composition.

The composition may additionally and optionally include one or more of a water soluble divalent metal salt, complexing agent, optical brightening agent, sizing agent, nonreactive sizing agent, reactive sizing agent, stabilizer, modified starch, unmodified starch, defoamer, surfactant, slip agent, dispersant, dye, retention aid, binder, filler, thickener, preservative, solvent, wet strength resin, internal size, dry strength resin, alum, pigment, bulking agent, expandable microsphere, pulp fiber, diamide salt, reducing agent, or a mixture thereof.

The composition optionally includes one or more water soluble divalent metal salt. When used in a recording sheet, the recording sheet may suitably contain an effective amount of the divalent water soluble metal salt in contact with at least one surface of the substrate. Here, an "effective amount" may be an amount which is sufficient to improve good dry time or any other printing property. This total amount of divalent water soluble metal salt in the substrate can vary widely, for example, greater than or equal to 0.02 g/m$^2$, although lower or higher amounts can be used. Generally, however, and if present, the amount of divalent water soluble metal salt may range from about 0.02 g/m$^2$ to about 4 g/m$^2$, which ranges includes all values and subranges therebetween, including 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.5, 2, 2.25, 2.5, 2.75, 3, 3.25, 3.5, 3.75, and 4 g/m$^2$ or any combination thereof.

Some examples of divalent water soluble metal salts include but are not limited to compounds containing divalent calcium, magnesium, barium, zinc, or any combination of these. The counter ions (anions) may be simple or complex and may vary widely. Illustrative of such materials are calcium salts, calcium chloride, magnesium chloride, calcium acetate, calcium lactate, calcium EDTA, Mg EDTA, and the like, and combinations thereof. Various water soluble divalent metal salts are disclosed in U.S. Provisional Application No. 61/132,672, filed Jun. 20, 2008, the relevant contents of which are hereby incorporated by reference.

The composition optionally contains one or more complexing agents. Complexing agents include any compound, molecule, or the like that has a chemical, physical, or physicochemical affinity for the divalent metal. The affinity may be reversible or irreversible. In one embodiment, if the complexing agent and water soluble divalent metal are used together, the affinity results in an association between the complexing agent and the divalent metal, to form an associated complex.

If both of a divalent metal salt and complexing agent are present, the ratio of metal to complexing agent may suitably range from 10:1 to 1:10, or any value or subrange therebetween, including any one of 10, 9, 8, 7, 6, 5, 4, 3, 2, 1 to any one of 1, 2, 3, 4, 5, 6, 7, 8, 9, 10.

Some examples of complexing agents which may be optionally included include compounds having one or more electron donating atoms such as nitrogen, oxygen, phosphorus, sulfur, and the like, organic phosphonate, phosphate, carboxylic acid, dithiocarbamate, EDTA salt, EGTA salt, DTPA salt, crown ether, EDTA (CAS 60-00-4), EDTA disodium salt [6381-92-6], EDTA tetrasodium salt [194491-31-1], EDTA trisodium salt, EDTA disodium magnesium salt [14402-88-1], EDTA disodium calcium salt, EDTA diammonium salt [20824-56-0], EDTA dipotassium salt [25102-12-9], EDTA tripotassium salt [65501-24-8], EDTA dilithium salt [14531-56-7], EDTA tetramethylammonium salt, EDTA calcium salt, EDTA magnesium salt, EDTA aluminum salt, polyacrylic acid, polyacrylic acid salt, polysorbate, poly-4-styrene sulfonic acid salt, glycerol formal, formamidinesulinic acid, sodium hypophosphite, potassium hypophosphite, calcium hypophosphite, organic phosphonate, organic phosphate, carboxylic acid, dithiocarbamate, sorbitol, sorbic acid, cellulose ether, CMC cellulose, hydroxyethyl cellulose, PEG, PEG derivatives, PPG, PPG derivatives, ionic liquid, 1-butyl-3-methyl-imidazolium-thiocyanate, and salts thereof. Combinations are possible. Various complexing agents are disclosed in U.S. Provisional Application No. 61/132,672, filed Jun. 20, 2008, the relevant contents of which are hereby incorporated by reference.

If present, the amount of complexing agent is not particularly limiting. When starch is used in the composition, the complexing agent may be present in an amount ranging from about 0.01 Lb/100 Lb starch to about 100 Lb/100 Lb starch. This range includes all values and subranges therebetween, including about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.5, 2, 2.5, 3, 3.5, 4, 4.5, 5, 10, 15, 20, 25, 30, 35, 40, 45, 50, 55, 60, 65, 70, 75, 80, 85, 90, 95, 99, and 100 Lb complexing agent/100 Lb starch. If no starch is used, then the complexing agent may be present in the composition in an amount ranging from about 0.01 Lb/ton of paper to about 100 Lb/ton of substrate. This range includes all values and subranges therebetween, including about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 10, 15, 20, 25, 30, 35, 40, 45, 50, 55, 60, 65, 70, 75, 80, 85, 90, 95, 99, and 100 Lb complexing agent/ton of substrate. In one embodiment, the amount of complexing agent ranges from about 0.1 to about 10 Lbs/ton of substrate.

The composition optionally contains one or more optical brightening agents, sometimes referred to as optical brighteners or OBAs. Typically, the optical brightening agents are fluorescent dyes or pigments that absorb ultraviolet radiation and reemit it at a higher wavelengths in the visible spectrum (blue), thereby effecting a white, bright appearance to the paper sheet when added to the stock furnish, but any optical brightening agent may be used. Representative optical brighteners include, but are not limited to azoles, biphenyls, coumarins, furans, stilbenes, ionic brighteners, including anionic, cationic, and anionic (neutral) compounds, such as the Eccobrite™ and Eccowhite™ compounds available from Eastern Color & Chemical Co. (Providence, R.I.); naphthalimides; pyrazenes; substituted (e.g., sulfonated) stilbenes, such as the Leucophor™ range of optical brighteners available from the Clariant Corporation (Muttenz, Switzerland), and Tinopal™ from Ciba Specialty Chemicals (Basel, Switzerland); salts of such compounds including but not limited to alkali metal salts, alkaline earth metal salts, transition metal salts, organic salts and ammonium salts of such brightening agents; and combinations of one or more of the foregoing agents.

If present, the amount of optical brightening agent is not particularly limited. When used in the composition, and if starch is present, the optical brighteners may be added in any amount ranging from 10 to 100 pounds per 100 pounds of starch. This range includes all values and subranges therebetween, including 10, 15, 20, 25, 30, 35, 40, 45, 50, 55, 60, 65, 70, 75, 80, 85, 90, 95 and 100 pounds. In another embodiment, the optical brightening agent may be added in amounts ranging from about 0.005 to about 4 weight percent based on the weight of the recording sheet. This range includes all values and subranges therebetween, including about 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, and 4 weight percent based on the weight of the substrate product. Various optical brightening agents are disclosed in U.S. Provisional Application No. 61/132,672, filed Jun. 20, 2008, the relevant contents of which are hereby incorporated by reference.

In one embodiment, a water soluble divalent metal salt, complexing agent, and optical brightener may be combined with the composition to achieve better brightness and whiteness.

The composition may optionally contain one or more sizing agents. The sizing agent is not particularly limited, and any conventional papermaking sizing agent may be used. The sizing agent may be nonreactive, reactive, or a combination of nonreactive and reactive. The sizing agent may, optionally and if desired, impart a moisture or water-resistance in varying degrees to the paper substrate. Non-limiting examples of sizing agents can be found in the "Handbook for Pulp and Paper Technologists" by G. A. Smook (1992), Angus Wilde Publications, which is hereby incorporated, in its entirety, by reference. Preferably, the sizing agent is a surface sizing agent. Preferable examples of sizing agents are starch, alkyl ketene dimer (AKD), alkenyl ketene dimer (ALKD), alkenyl succinic anhydride (ASA), ASA/ALKD, styrene acrylic emulsion (SAE) polyvinyl alcohol (PVOH), polyvinylamine, alginate, carboxymethyl cellulose, etc. However, any sizing agent may be used. See, for example, the sizing agents disclosed in U.S. Pat. No. 6,207,258, the entire contents of which are hereby incorporated by reference.

Many nonreactive sizing agents are known in the art. Examples include, without limitation, BASOPLAST® 335D nonreactive polymeric surface size emulsion from BASF Corporation (Mt. Olive, N.J.), FLEXBOND® 325 emulsion of a copolymer of vinyl acetate and butyl acrylate from Air Products and Chemicals, Inc. (Trexlertown, Pa.), and PENTAPRINT® nonreactive sizing agents (disclosed for example in Published International Patent Application Publication No. WO 97/45590, published Dec. 4, 1997, corresponding to U.S. patent application Ser. No. 08/861,925, filed May 22, 1997, the entire contents of which are hereby incorporated by reference) from Hercules Incorporated (Wilmington, Del.).

For papermaking carried out under alkaline pH manufacturing conditions, sizing agents based on alkyl ketene dimers (AKDs) or alkenyl ketene dimers (ALKDs) or multimers and alkenyl succinic anhydride (ASA) sizing agents may be suitably used. Combinations of these and other sizing agents may also be employed.

Ketene dimers used as sizing agents for papermaking are well known. AKDs, containing one β-lactone ring, are typically prepared by the dimerization of alkyl ketenes made from two fatty acid chlorides. Commercial alkyl ketene dimer sizing agents are often prepared from palmitic and/or stearic fatty acids, e.g. Hercon® and Aquapel® sizing agents (both from Hercules Incorporated).

Alkenyl ketene dimer sizing agents are also commercially available, e.g. Precis® sizing agents (Hercules Incorporated).

U.S. Pat. No. 4,017,431, the entire contents of which are hereby incorporated by reference, provides a nonlimiting exemplary disclosure of AKD sizing agents with wax blends and water soluble cationic resins.

Ketene multimers containing more than one β-lactone ring may also be employed as sizing agents.

Sizing agents prepared from a mixture of mono- and dicarboxylic acids, have been disclosed as sizing agents for paper in Japanese Kokai Nos. 168991/89 and 168992/89.

European patent application Publication No. 0 629 741 A1 discloses alkyl ketene dimer and multimer mixtures as sizing agents in paper used in high speed converting and reprographic machines. The alkyl ketene multimers are made from the reaction of a molar excess of monocarboxylic acid, typically a fatty acid, with a dicarboxylic acid. These multimer compounds are solids at 25° C.

European patent application Publication No. 0 666 368 A2 and Bottorff et al. in U.S. Pat. No. 5,685,815, the entire contents of which are hereby incorporated by reference, disclose paper for high speed or reprographic operations that is internally sized with an alkyl or alkenyl ketene dimer and/or multimer sizing agent. The preferred 2-oxetanone multimers are prepared with fatty acid to diacid ratios ranging from 1:1 to 3.5:1.

Commercial ASA-based sizing agents are dispersions or emulsions of materials that may be prepared by the reaction of maleic anhydride with an olefin ($C_{14}$-$C_{18}$).

Hydrophobic acid anhydrides may also be used as sizing agents. For example, rosin anhydrides (see U.S. Pat. No. 3,582,464, for example, the entire contents of which are hereby incorporated by reference); myristoyl anhydride; palmitoyl anhydride; oleoyl anhydride; and stearoyl anhydride may be used. Other sizing agents which may be used include substituted cyclic dicarboxylic acid anhydrides, substituted succinic, glutaric anhydrides, i- and n-octadecenyl succinic acid anhydride; i- and n-hexadecenyl succinic acid anhydride; i- and n-tetradecenyl succinic acid anhydride, dodecyl succinic acid anhydride; decenyl succinic acid anhydride; ectenyl succinic acid anhydride; and heptyl glutaric acid anhydride.

Other examples of nonreactive sizing agents include a polymer emulsion, a cationic polymer emulsion, an amphoteric polymer emulsion, polymer emulsion wherein at least one monomer is selected from the group including styrene, α-methylstyrene, acrylate with an ester substituent with 1 to 13 carbon atoms, methacrylate having an ester substituent with 1 to 13 carbon atoms, acrylonitrile, methacrylonitrile, vinyl acetate, ethylene and butadiene; and optionally including acrylic acid, methacrylic acid, maleic anhydride, esters of maleic anhydride or mixtures thereof, with an acid number less than about 80, and mixtures thereof.

If desired, the polymer emulsion may stabilized by a stabilizer predominantly including degraded starch, such as that disclosed, for example, in U.S. Pat. Nos. 4,835,212, 4,855, 343, and 5,358,998, the entire contents of each of which are hereby incorporated by reference. If desired, a polymer emulsion may be used in which the polymer has a glass transition temperature of about −15° C. to about 50° C.

For traditional acid pH papermaking conditions, nonreactive sizing agents in the form of dispersed rosin sizing agents may be suitably used. Dispersed rosin sizing agents are well known. Nonlimiting examples of rosin sizing agents are disclosed in, for example, U.S. Pat. Nos. 3,966,654 and 4,263, 182, the entire contents of each of which are hereby incorporated by reference.

The rosin may be any modified or unmodified, dispersible or emulsifiable rosin suitable for sizing paper, including unfortified rosin, fortified rosin and extended rosin, as well as rosin esters, and mixtures and blends thereof. As used herein, the term "rosin" means any of these forms of dispersed rosin useful in a sizing agent.

The rosin in dispersed form is not particularly limited, and any of the commercially available types of rosin, such as wood rosin, gum rosin, tall oil rosin, and mixtures of any two or more, in their crude or refined state, may be used. In one embodiment, tall oil rosin and gum rosin are used. Partially hydrogenated rosins and polymerized rosins, as well as rosins that have been treated to inhibit crystallization, such as by heat treatment or reaction with formaldehyde, may also be employed.

Hydrophobic organic isocyanates, e.g., alkylated isocyanates, may also be used as sizing agents.

Other conventional paper sizing agents include alkyl carbamoyl chlorides, alkylated melamines such as stearylated melamines, and styrene acrylates.

Mixtures of sizing agents are possible.

An external sizing agent or both internal and surface sizing agents may be used. Either or both may contain the core/shell particles and optional constituents such as divalent metal salt, optical brightening agent, complexing agent, binder, and the like as appropriate. When both internal and external sizing agents are present, they may be present in any weight ratio and may be the same and/or different. In one embodiment, the weight ratio of surface sizing agent to internal sizing agent is from 50/50 to 100/0, more preferably from 75/25 to 100/0 surface/internal sizing agent. This range includes 50/50, 55/45, 60/40, 65/35, 70/30, 75/25, 80/20, 85/15, 90/10, 95/5 and 100/0, including any and all ranges and subranges therein. One example of an internal sizing agent is alkenyl succinic anhydride (ASA).

When starch is used as a sizing agent, starch may be modified or unmodified. Examples of starch may be found in the "Handbook for Pulp and Paper Technologists" by G. A. Smook (1992), Angus Wilde Publications, mentioned above. Preferable examples of modified starches include, for example, oxidized, cationic, ethylated, hydroethoxylated, etc. In addition, the starch may come from any source, preferably potato and/or corn. Most preferably, the starch source is corn.

In one embodiment, a mixture comprising the core/shell particles and one or more starches is in contact with at least one surface of the substrate. Illustrative of useful starches include naturally occurring carbohydrates synthesized in corn, tapioca, potato and other plants by polymerization of dextrose units. All such starches and modified forms thereof such as starch acetates, starch esters, starch ethers, starch phosphates, starch xanthates, anionic starches, cationic starches, oxidized starches, and the like which can be derived by reacting the starch with a suitable chemical or enzymatic reagent can be used. If desired, starches may be prepared by known techniques or obtained from commercial sources. For example, one example of a commercial starches include Ethylex 2035 from A.E. Staley, PG-280 from Penford Products, oxidized corn starches from ADM, Cargill, and Raisio, and enzyme converted starches such as Amyzet 150 from Amylum.

Modified starches may be used. Non-limiting examples of a type of modified starches include cationic modified chemically modified starches such as ethylated starches, oxidized starches, and AP and enzyme converted Pearl starches. Most preferred are chemically modified starches such as ethylated starches, oxidized starches, and AP and enzyme converted Pearl starches.

In one embodiment, the composition and/or sizing agent is applied in an amount such such that a dry pickup of 30 to 150 lbs of starch/ton of paper at 12-50% solids for the size press formulation. Here, lbs/ton is calculated on a substrate, e.g., paper having a basis weight equal to 75 gsm.

The aforementioned range of starch includes all values and subranges therebetween, including 30, 35, 40, 45, 50, 55, 60, 65, 70, 75, 80, 85, 90, 95, 100, 105, 110, 115, 120, 125, 130, 135, 140, 145, and 150 lbs/ton. Here, lbs/ton is calculated on a paper having a basis weight equal to 75 gsm.

It should be readily apparent that the amounts in lbs/ton and moles/ton may vary in a known manner according to the basis weight of the paper, and the invention is not limited to only paper having a basis weight of 75 gsm.

In one embodiment, an I-beam structure is formed according to known methods.

Examples of optional fillers include, but are not limited to, clay, calcium carbonate, calcium sulfate hemihydrate, and calcium sulfate dehydrate, chalk, GCC, PCC, and the like.

In one embodiment, the term binder is used interchangeably with sizing agent herein.

Examples of optional binders include, but are not limited to, polyvinyl alcohol, Amres (a Kymene type), Bayer Parez, polychloride emulsion, modified starch such as hydroxyethyl starch, starch, polyacrylamide, modified polyacrylamide, polyol, polyol carbonyl adduct, ethanedial/polyol condensate, polyamide, epichlorohydrin, glyoxal, glyoxal urea, ethanedial, aliphatic polyisocyanate, isocyanate, 1,6 hexamethylene diisocyanate, diisocyanate, polyisocyanate, polyester, polyester resin, polyacrylate, polyacrylate resin, acrylate, and methacrylate. Other optional substances include, but are not limited to silicas such as colloids and/or sols. Examples of silicas include, but are not limited to, sodium silicate and/or borosilicates. Another example of optional substances are solvents including but not limited to solvents such as water. Combinations of optional substances are possible.

In one embodiment, the recording sheet may contain from 0.001 to 20 wt % of the optional substances based on the total weight of the substrate, preferably from 0.01 to 10 wt %, most preferably 0.1 to 5.0 wt %, of each of at least one of the optional substances. This range includes 0.001, 0.002, 0.005, 0.006, 0.008, 0.01, 0.02, 0.03, 0.04, 0.05, 0.1, 0.2, 0.4, 0.5, 0.6, 0.7, 0.8, 0.9, 1, 2, 4, 5, 6, 8, 10, 12, 14, 15, 16, 18, and 20 wt % based on the total weight of the substrate, including any and all ranges and subranges therein.

The paper substrate or sizing agent may optionally contain a bulking agent in any amount, if present, ranging from 0.25 to 50 dry lbs per ton of finished substrate, preferably from 5 to 20, dry lb per ton of finished product when such bulking means is an additive. This range includes 0.25, 0.5, 0.75, 1.0, 2.0, 2.5, 3.0, 3.5, 4, 4.5, 5, 5.5, 6, 6.5, 7, 7.5, 8, 8.5, 9, 9.5, 10, 11, 12, 13, 14, 15, 20, 25, 30, 35, 40, 45, and 50 dry lb per ton of finished product, including any and all ranges and subranges therein.

The bulking agent is not particularly limited, and may be an expandable microsphere (optionally and in addition to the core/shell particle), composition, and/or particle. Some examples of bulking agents include, but are not limited to, surfactants, Reactopaque, pre-expanded spheres, BCTMP (bleached chemi-thermomechanical pulp), microfinishing, and multiply construction for creating an I-beam effect in a paper or paper board substrate. Such bulking agents may, when incorporated or applied to a paper substrate, improve print quality, caliper, basis weight, etc., in the absence of harsh calendaring conditions (i.e. pressure at a single nip and/or less nips per calendaring means), yet produce a paper substrate having the a single, a portion of, or combination of the physical specifications and performance characteristics mentioned herein.

In one embodiment, the paper substrate may optionally contain from 0.001 to 10 wt %, preferably from 0.02 to 5 wt %, more preferably from 0.025 to 2 wt %, most preferably from 0.125 to 0.5 wt % of expandable microspheres based on the total weight of the substrate.

Some examples of expandable microspheres having bulking capacity are those described in U.S. Patent Application No. 60/660,703 filed Mar. 11, 2005, and U.S. patent application Ser. No. 11/374,239 filed Mar. 13, 2006, which are also hereby incorporated, in their entirety, by reference. Further examples include those found in U.S. Pat. No. 6,379,497, filed May 19, 1999, and U.S. Patent Publication No. 2006/0102307, filed Jun. 1, 2004, which are also hereby incorporated, in their entirety, by reference.

Other examples of bulking fibers include, but are not limited to, mechanical fibers such as ground wood pulp, BCTMP, and other mechanical and/or semi-mechanical pulps. When such pulps are added, from 0.25 to 75 wt %, preferably less than 60 wt % of total weight of the fibers used may be from such bulking fibers.

Examples of diamide salts include those described in U.S. Patent Publication No. 2004/0065423, filed Sep. 15, 2003, which is hereby incorporated in its entirety by reference. Non-limiting examples of such salts include mono- and distearamides of animoethylethalonalamine, which may be commercially known as Reactopaque 100, (Omnova Solutions Inc., Performance Chemicals, 1476 J. A. Cochran By-Pass, Chester, S.C. 29706, USA and marketed and sold by Ondeo Nalco Co., with headquarters at Ondeo Nalco Center, Naperville, Ill. 60563, USA) or chemical equivalents thereof. When such salts are used, about 0.025 to about 0.25 wt % by weight dry basis of the diamide salt may be used.

Other optional components include nitrogen containing compounds. Non-limiting examples of these include nitrogen containing organic species, for example oligomers and polymers which contain one or more quaternary ammonium functional groups. Such functional groups may vary widely and include, for example, substituted and unsubstituted amines, imines, amides, urethanes, quaternary ammonium groups, dicyandiamides, guanides, and the like. Illustrative of such materials are polyamines, polyethyleneimines, copolymers of diallyldimethyl ammonium chloride (DADMAC), copolymers of vinyl pyrrolidone (VP) with quaternized diethylaminoethylmethacrylate (DEAMEMA), polyamides, cationic polyurethane latex, cationic polyvinyl alcohol, polyalkylamines dicyandiamid copolymers, amine glycigyl addition polymers, poly[oxyethylene(dimethyliminio)ethylene(dimethyliminio)ethylene]dichlorides, guanidine polymers, and polymeric biguanides. Combinations of these nitrogen containing compounds are possible. Some examples of these compounds are described in, for example, U.S. Pat. No. 4,554,181, U.S. Pat. No. 6,485,139, U.S. Pat. No. 6,686,054, U.S. Pat. No. 6,761,977 and U.S. Pat. No. 6,764,726, the entireties of each of which being hereby incorporated by reference.

The expandable microspheres, if present, may contain an expandable shell forming a void inside thereof. The expandable shell may comprise a carbon and/or heteroatom containing compound. An example of a carbon and/or heteroatom containing compound may be an organic polymer and/or copolymer. The polymer and/or copolymer may be branched and/or crosslinked.

Optional additional expandable microspheres, if present, may include heat expandable thermoplastic polymeric hollow spheres containing a thermally activatable expanding agent. Examples of expandable microsphere compositions, their contents, methods of manufacture, and uses can be found, in U.S. Pat. Nos. 3,615,972; 3,864,181; 4,006,273; 4,044,176; and 6,617,364 which are hereby incorporated, in their entirety, herein by reference. Further reference can be made to U.S. Patent Publication Nos. 2001/0044477; 2003/0008931; 2003/0008932; and 2004/0157057, which are hereby incorporated, in their entirety, by reference. Microspheres may be prepared from polyvinylidene chloride, polyacrylonitrile, poly-alkyl methacrylates, polystyrene or vinyl chloride.

The optional, additional microspheres may contain a polymer and/or copolymer that has a Tg ranging from −150 to +180° C. as appropriate.

The optional, additional microspheres may also contain one or more blowing agents which, upon application of heat, functions to pressurize and expand the microsphere. Blowing agents may be liquids and/or gases. Further, examples of blowing agents may be selected from low boiling point molecules and compositions thereof. Such blowing agents may be selected from the lower alkanes such as neopentane, neohexane, hexane, propane, butane, pentane, and mixtures and isomers thereof. Isobutane is the preferred blowing agent for polyvinylidene chloride microspheres. Examples of coated unexpanded and expanded microspheres are disclosed in U.S. Pat. Nos. 4,722,943 and 4,829,094, which are hereby incorporated, in their entirety, by reference.

The expandable microspheres, if present, may have a mean diameter ranging from about 0.5 to 200 microns as appropriate in the unexpanded state and having a maximum expansion of from about 1.5 and 10 times the mean diameters.

In one embodiment, if present, the expandable microspheres may be neutral, negatively or positively charged, preferably negatively charged.

The substrate may be a paper substrate, a plastic substrate, or a combination thereof. Referring to the substrate, unless indicated otherwise, the terms paper and plastic may be used interchangeably herein.

In one embodiment, the composition is applied to plastic substrate to produce a recording sheet. The plastic substrate may be suitably made of a polymeric material, for example, one that is resistant to tearing and thermal damage which may be caused by heat in a copier or printer. Some non-limiting examples of polymeric materials include thermoplastic polymers, such as polyesters, polysulfones, polyvinyl chloride, polyvinyl acetate, polycarbonates, polymethylmethacrylate, cellulose esters, fluoropolymers. biaxially oriented polypropylene (BOPP), polyvinyl chloride (PVC), and polyethylene terephthalate (PET), blends thereof, copolymers thereof, and the like. Combinations of polymeric materials may be used. The plastic substrate may be transparent, translucent, or opaque.

The thickness of the plastic substrate is not generally limiting, and may be any thickness suitable for any printing application. In one embodiment, the thickness ranges from about 1 to 12 mils. This range includes all values and subranges therebetween, including about 1, 2, 3, 4, 5, 6, 7, 8, 9, 10, 11, and 12 mils.

The plastic substrate may be clear or transparent, opaque, or anything in between. In one embodiment, a clear or transparent polyethylene terephthalate (PET) or an opaque polyvinyl chloride (PVC) film may be used. If desired, the plastic substrate may be pre-treated with conventional adhesion promoters on one surface or both surfaces to enhance adhesion of the coating composition to the plastic substrate.

In one embodiment, the composition is applied to a paper substrate to produce a recording sheet. The paper substrate suitably comprises a plurality of cellulosic fibers. The type of cellulosic fiber is not critical, and any such fiber known or suitable for use in paper making can be used. For example, the substrate can made from pulp fibers derived from hardwood trees, softwood trees, or a combination of hardwood and softwood trees. The fibers may be prepared for use in a papermaking furnish by one or more known or suitable digestion, refining, and/or bleaching operations such as, for example, known mechanical, thermomechanical, chemical and/or semichemical pulping and/or other well known pulping processes. The term, "hardwood pulps" as may be used herein include fibrous pulp derived from the woody substance of deciduous trees (angiosperms) such as birch, oak, beech, maple, and eucalyptus. The term, "softwood pulps" as may be used herein include fibrous pulps derived from the woody substance of coniferous trees (gymnosperms) such as varieties of fir, spruce, and pine, as for example loblolly pine, slash pine, Colorado spruce, balsam fir and Douglas fir. In some embodiments, at least a portion of the pulp fibers may be provided from non-woody herbaceous plants including, but not limited to, kenaf, hemp, jute, flax, sisal, or abaca, although legal restrictions and other considerations may make the utilization of hemp and other fiber sources impractical or impossible. Either bleached or unbleached pulp fiber may be utilized. Recycled pulp fibers are also suitable for use.

The paper substrate may suitably contain from 1 to 99 wt % of cellulosic fibers based upon the total weight of the substrate. In one embodiment, the paper substrate may contain from 5 to 95 wt % of cellulosic fibers based upon the total weight of the substrate. These ranges include any and all values and subranges therebetween, for example, 1, 5, 10, 15, 20, 25, 30, 35, 40, 45, 50, 55, 60, 65, 70, 75, 80, 85, 90, 95 and 99 wt %.

The paper substrate may optionally contain from 1 to 100 wt % cellulosic fibers originating from softwood species based upon the total amount of cellulosic fibers in the paper substrate. In one embodiment, the paper substrate may contain 10 to 60 wt % cellulosic fibers originating from softwood species based upon the total amount of cellulosic fibers in the paper substrate. These ranges include 1, 2, 5, 10, 15, 20, 25, 30, 35, 40, 45, 50, 55, 60, 65, 70, 75, 80, 85, 90, 95, and 100 wt % and any and all ranges and subranges therein, based upon the total amount of cellulosic fibers in the paper substrate.

In one embodiment, the paper substrate may alternatively or overlappingly contain from 0.01 to 99 wt % fibers from softwood species, based on the total weight of the paper substrate. In another embodiment, the paper substrate may contain from 10 to 60 wt % fibers from softwood species based upon the total weight of the paper substrate. These ranges include any and all values and subranges therein. For example, the paper substrate may contain not more than 0.01, 0.05, 0.1, 0.2, 0.5, 1, 2, 3, 4, 5, 6, 7, 8, 9, 10, 12, 15, 20, 25, 30, 35, 40, 45, 50, 55, 60, 65, 70, 75, 80, 85, 90, 95 and 99 wt % softwood based upon the total weight of the paper substrate.

All or part of the softwood fibers may optionally originate from softwood species having a Canadian Standard Freeness (CSF) of from 300 to 750. In one embodiment, the paper substrate contains fibers from a softwood species having a CSF from 400 to 550. These ranges include any and all values and subranges therebetwen, for example, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, and 750 CSF. Canadian Standard Freeness is as measured by TAPPI T-227 standard test.

The paper substrate may optionally contain from 1 to 100 wt % cellulosic fibers originating from hardwood species based upon the total amount of cellulosic fibers in the paper substrate. In one embodiment, the paper substrate may contain from 30 to 90 wt % cellulosic fibers originating from hardwood species, based upon the total amount of cellulosic fibers in the paper substrate. These ranges include 1, 2, 5, 10, 15, 20, 25, 30, 35, 40, 45, 50, 55, 60, 65, 70, 75, 80, 85, 90, 95, and 100 wt %, and any and all values and subranges therein, based upon the total amount of cellulosic fibers in the paper substrate.

In one embodiment, the paper substrate may alternatively or overlappingly contain from 0.01 to 99 wt % fibers from hardwood species, based upon the total weight of the paper substrate. In another embodiment, the paper substrate may alternatively or overlappingly contain from 60 to 90 wt % fibers from hardwood species, based upon the total weight of the paper substrate. These ranges include any and all values and subranges therebetween, including not more than 0.01, 0.05, 0.1, 0.2, 0.5, 1, 2, 3, 4, 5, 6, 7, 8, 9, 10, 12, 15, 20, 25, 30, 35, 40, 45, 50, 55, 60, 65, 70, 75, 80, 85, 90, 95, 99 and 99 wt %, based upon the total weight of the paper substrate.

All or part of the hardwood fibers may optionally originate from hardwood species having a Canadian Standard Freeness of from 300 to 750. In one embodiment, the paper substrate may contain fibers from hardwood species having CSF values of from 400 to 550. These ranges include 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, and 750 CSF, and any and all ranges and subranges therein.

The paper substrate may optionally contain less refined fibers, for example, less refined softwood fibers, less refined hardwood, or both. Combinations of less refined and more refined fibers are possible. In one embodiment, the paper substrate contains fibers that are at least 2% less refined than that of fibers used in conventional paper substrates. This range includes all values and subranges therebetween, including at least 2, 5, 10, 15, and 20%. For example, if a conventional paper contains fibers, softwood and/or hardwood, having a Canadian Standard Freeness of 350, then, in one embodiment, the paper substrate may contain fibers having a CSF of 385 (i.e. refined 10% less than conventional) and still perform similar, if not better, than the conventional paper. Nonlimiting examples of some performance qualities of the paper substrate are discussed below. Examples of some reductions in refining of hardwood and/or softwood fibers include, but are not limited to: 1) from 350 to at least 385 CSF; 2) from 350 to at least 400 CSF; 3) from 400 to at least 450 CSF; and 4) from 450 to at least 500 CSF. In some embodiments, the reduction in fiber refinement may be at least 2, 3, 4, 5, 6, 7, 8, 9, 10, 11, 12, 13, 14, 15, 16, 17, 18, 19, 20, and 25% reduction in refining compared to those fibers in conventional paper substrates.

When the paper substrate contains both hardwood fibers and softwood fibers, the hardwood/softwood fiber weight ratio may optionally range from 0.001 to 1000. In one embodiment, the hardwood/softwood ratio may range from 90/10 to 30/60. These ranges include all values and subranges therebetween, including 0.001, 0.002, 0.005, 0.01, 0.02, 0.05, 0.1, 0.2, 0.5, 1, 2, 5, 10, 15, 20, 25, 30, 35, 40, 45, 50, 55, 60, 65, 70, 75, 80, 85, 90, 95, 100, 200, 300, 400, 500, 600, 700, 800, 900, and 1000.

The softwood fibers, hardwood fibers, or both may be optionally modified by physical and/or chemical processes. Examples of physical processes include, but are not limited to, electromagnetic and mechanical processes. Examples of electrical modifications include, but are not limited to, processes involving contacting the fibers with an electromagnetic energy source such as light and/or electrical current. Examples of mechanical modifications include, but are not limited to, processes involving contacting an inanimate object with the fibers. Examples of such inanimate objects include those with sharp and/or dull edges. Such processes also involve, for example, cutting, kneading, pounding, impaling, and the like, and combinations thereof.

Nonlimiting examples of chemical modifications include conventional chemical fiber processes such as crosslinking and/or precipitation of complexes thereon. Other examples of suitable modifications of fibers include those found in U.S. Pat. Nos. 6,592,717, 6,592,712, 6,582,557, 6,579,415, 6,579, 414, 6,506,282, 6,471,824, 6,361,651, 6,146,494, H1,704, 5,731,080, 5,698,688, 5,698,074, 5,667,637, 5,662,773, 5,531,728, 5,443,899, 5,360,420, 5,266,250, 5,209,953, 5,160,789, 5,049,235, 4,986,882, 4,496,427, 4,431,481, 4,174,417, 4,166,894, 4,075,136, and 4,022,965, the entire contents of each of which are hereby incorporated, independently, by reference. Still other examples of suitable modifications of fibers may be found in U.S. Application Nos. 60/654,712, filed Feb. 19, 2005, and Ser. No. 11/358,543, filed Feb. 21, 2006, the entire contents of each of which are hereby incorporated, independently, by reference.

The paper substrate may optionally include "fines." "Fines" fibers are typically those fibers with average lengths of not more than about 100 μm. Sources of "fines" may be found in SaveAll fibers, recirculated streams, reject streams, waste fiber streams, and combinations thereof. The amount of "fines" present in the paper substrate can be modified, for example, by tailoring the rate at which streams are added to the paper making process. In one embodiment, the average lengths of the fines are not more than about 5, 10, 15, 20, 25, 30, 35, 40, 45, 50, 55, 60, 65, 70, 75, 80, 85, 90, 95, and 100 μm, including any and all ranges and subranges therein.

If used, the "fines" fibers may be present in the paper substrate together with hardwood fibers, softwood fibers, or both hardwood and softwood fibers.

The paper substrate may optionally contain from 0.01 to 100 wt % fines, based on the total weight of the paper substrate. In one embodiment, the paper substrate may contain from 0.01 to 50 wt % fines, based upon the total weight of the substrate. These ranges include all values and subranges therebetween, including not more than 0.01, 0.05, 0.1, 0.2, 0.5, 1, 2, 3, 4, 5, 6, 7, 8, 9, 10, 12, 15, 20, 25, 30, 35, 40, 45, 50, 55, 60, 65, 70, 75, 80, 85, 90, 95 and 100 wt % fines, based upon the total weight of the paper substrate.

Paper substrates suitable for use herein may have any basis weight. It may have either a high or low basis weight, including basis weights of at least 10 lbs/3000 square foot, preferably from at least 20 to 500 lbs/3000 square foot, more preferably from at least 40 to 325 lbs/3000 square foot. The basis weight may be at least 10, 20, 30, 40, 50, 60, 70, 80, 90, 100, 125, 150, 175, 200, 225, 250, 275, 300, 325, 350, 375, 400, 425, 450, 475, and 500 lbs/3000 square feet, including any and all ranges and subranges therein.

The sizing or coating composition may be added to bleached pulp or paper product at any point in the paper manufacturing process. Some examples of addition points include, but are not limited to (a) to the pulp slurry in the latency chest; (b) to the pulp during or after the bleaching stage in a storage, blending or transfer chest; (c) before the final debleaching stage; (d) to pulp after bleaching, washing and dewatering followed by cylinder or flash drying; (e) before or after the cleaners; (f) before or after the fan pump to the paper machine headbox; (g) to the paper machine white water; (h) sprayed or showered onto the moving wet web after head box forming but before wet press; (i) to the silo or save all; (j) in the press section using, for example, a size press, coater or spray bar; (k) in the drying section using, for example, a size press, coater or spray bar; (l) on the calender using a wafer box; (m) on paper in an off-machine coater or size press; and/or (n) in the curl control unit. Combinations are possible.

The precise location where the composition is added will depend on the specific equipment involved, the exact process conditions being used and the like. These are easily determined given the teachings herein combined with the knowledge of one of ordinary skill in the papermaking art.

Application can be by any means conventionally used in papermaking processes, including by "split-feeding" for example on pulp or a wet sheet (before the dryers) and the remaining portion of the composition is added at a subsequent point, for example, in the size press.

In one embodiment, all or part of the composition may be added to a bleached pulp or paper product before, after or simultaneously with a sizing composition.

In another embodiment, the composition may be mixed with a surface sizing solution and applied in the size press.

The composition may be applied to the paper substrate at a size press, where any sizing means commonly known in the art of papermaking is acceptable. The size press, for example, may be a puddle mode size press (e.g. inclined, vertical, horizontal) or metered size press (e.g. blade metered, rod metered). In one embodiment, the size press is a metered size press.

In one embodiment, the composition can be applied with conventional size press equipment having vertical, horizontal or inclined size press configurations conventional used in paper preparation as for example the Symsizer (Valmet) type equipment, a KRK size press (Kumagai Riki Kogyo Co., Ltd., Nerima, Tokyo, Japan) by dip coating. The KRK size press is a lab size press that simulates a commercial size press. This size press is normally sheet fed, whereas a commercial size press typically employs a continuous web.

In one embodiment, the temperature at the size press may suitably range from 100-300° F. This range includes all values and subranges therebetween, including 100, 110, 120, 130, 140, 150, 160, 170, 180, 190, 200, 210, 220, 230, 240, 250, 260, 270, 280, 290, and 300° F.

In one embodiment, a rod-metered size press is used. In such an embodiment, a suitable rod volume may range from 0.000864 $in^2/in$ to 0.001637 $in^2/in$. This range includes all values and subranges therebetween, including 0.000865, 0.00087, 0.0009, 0.0010, 0.0015, and 0.001637 $in^2/in$.

When the cellulosic fibers are contacted with the composition at the size press, it is preferred that the viscosity of the composition is from 50 to 500 centipoise using a Brookfield Viscometer, number 2 spindle, at 100 rpm and 150° F. These ranges include all values and subranges therebetween, including 50, 55, 60, 65, 70, 75, 80, 85, 90, 95, 100, 125, 150, 160, 170, 180, 190, 200, 210, 220, 230, 240, 250, 260, 270, 280, 290, 300, 325, 350, 375, 400, 425, and 450 centipoise as measured using a Brookfield Viscometer, number 2 spindle, at 100 rpm and 150° F., including any and all ranges and subranges therein. In one embodiment, the viscosity ranges from 50 to 350 centipoise. In another embodiment, the viscosity ranges from 100 to 500 centipoise.

The paper substrate may be pressed in a press section containing one or more nips. Any pressing means commonly known in the art of papermaking may be utilized. The nips may be, but are not limited to, single felted, double felted, roll, and extended nip in the presses. When the sizing solution containing the sizing agent is contacted with the fibers at the size press to make the paper substrate, the effective nip pressure is not particularly limited so long as integrity of the I-beam structure is maintained. For example, the nip pressure may suitably range from greater than zero to 80 kN/m. This range includes all values and subranges therebetween, including greater than zero, 1, 2, 3, 4, 5, 6, 7, 8, 9, 10, 15, 20, 25, 30, 35, 40, 45, 50, 55, 60, 70, and 80 kN/m, including any and all ranges and subranges therein. In one embodiment, the nip pressure ranges from 30 to 80 kN/m.

The nip width is not particularly limited, and may suitably range from greater than zero to 40 mm. This range includes all values and subranges therebetween, including greater than zero, 1, 2, 3, 4, 5, 6, 7, 8, 9, 10, 15, 16, 17, 18, 19, 20, 25, 30, 35, and 40 mm. In one embodiment, the nip width ranges from 15 to 30 mm.

The recording sheet may be dried in a drying section. Any drying means commonly known in the art of papermaking may be utilized. The drying section may include and contain a drying can, cylinder drying, Condebelt drying, IR, or other drying means and mechanisms known in the art. The recording sheet may be dried so as to contain any selected amount of water. Preferably, the recording sheet is dried to contain less than or equal to 10% water.

The recording sheet may be calendered by any commonly known calendaring means in the art of papermaking. More specifically, one could utilize, for example, wet stack calendering, dry stack calendering, steel nip calendering, hot soft calendaring or extended nip calendering, etc.

The recording sheet may be microfinished according to any process commonly known in the art of papermaking Microfinishing typically involves frictional processes to finish surfaces of the recording sheet. The recording sheet may be microfinished with or without a calendering applied thereto consecutively and/or simultaneously. Examples of microfinishing processes can be found in U.S. Patent Publication No. 2004/0123966 and references cited therein, as well as U.S. Provisional Patent Application No. 60/810,181 filed Jun. 2, 2006, which are all hereby, in their entirety, herein incorporated by reference.

In one embodiment, the recording sheet comprising the composition and a sizing agent may be further coated by any conventional coating layer application means, including impregnation means. A preferred method of applying the coating layer is with an in-line coating process with one or more stations. The coating stations may be any of known coating means commonly known in the art of papermaking including, for example, brush, rod, air knife, spray, curtain, blade, transfer roll, reverse roll, and/or cast coating means, as well as any combination of the same.

The further coated recording sheet may be dried in a drying section. Any drying means commonly known in the art of papermaking and/or coatings may be utilized. The drying section may include and contain IR, air impingement dryers and/or steam heated drying cans, or other drying means and mechanisms known in the coating art.

The further coated recording sheet may be finished according to any finishing means commonly known in the art of papermaking Examples of such finishing means, including one or more finishing stations, include gloss calendar, soft nip calendar, and/or extended nip calendar.

These paper substrate and/or recording sheet may be subjected to any conventional papermaking processes, as well as converting processes, including abrading, sanding, slitting, scoring, perforating, sparking, calendaring, sheet finishing, converting, coating, laminating, printing, etc. In one embodiment, the conventional processes include those tailored to produce paper substrates capable to be utilized as coated and/or uncoated paper products, board, and/or substrates. These and other suitable processes may be found in textbooks such as the "Handbook for Pulp and Paper Technologists" by G. A. Smook (1992), Angus Wilde Publications, which is hereby incorporated, in its entirety, by reference.

It may be advantageous that a majority of the total amount of composition is located at or near the outside surface or surfaces (in the case of application to both surfaces) of the paper substrate. In one embodiment, the paper substrate contains the composition such that they (the substrate and the composition) cooperate to form an I-beam structure. I-beam structures are discussed, for example, in U.S. Patent Publication No. 2004/0065423, published Apr. 8, 2004, and in U.S. Provisional Application No. 61/040,806, filed Mar. 31, 2008, the relevant contents of each of which are hereby incorporated by reference. In this regard, it is not required that the composition interpenetrate with the cellulosic fibers of the substrate. However, if the composition and the cellulose fibers interpenetrate, it will create a paper substrate having an interpenetration layer, which is within the ambit of the present invention.

In one embodiment, the interpenetration layer of the paper substrate may define a region in which at least the composition penetrates into and is among the cellulose fibers. The interpenetration layer may be from 1 to 99% of the entire cross section of at least a portion of the paper substrate, including 1, 2, 5, 10, 15, 20, 25, 30, 35, 40, 45, 50, 55, 60, 65, 70, 75, 80, 85, 90, 95, and 99% of the paper substrate, including any and all ranges and subranges therein. Such an embodiment may be made, for example, when the composition is added to the cellulose fibers prior to coating method and may be combined with a subsequent coating method if required. Addition points may be at the size press, for example.

In one embodiment, the cross-sectional thickness of the interpenetration layer may be minimized. Alternatively, or additionally, the concentration of the composition preferably increases as one moves (in the z-direction normal to the plane of the substrate) from the interior portion towards the surface of the paper substrate. Therefore, the amount of composition present towards the top and/or bottom outer surfaces of the substrate may be greater than the amount of composition present towards the inner middle of paper substrate. Alternatively, a majority percentage of the composition may preferably be located at a distance from the outside surface of the substrate that is equal to or less than 25%, more preferably 10%, of the total thickness of the substrate. This aspect may also be known as the $Q_{total}$, which is measured by known methodologies outlined, for example, in U.S. Patent Publication No. 2008/0035292, published Feb. 14, 2008, the entire contents of which are hereby incorporated by reference. If $Q_{total}$ is equal to 0.5, then the composition is approximately evenly distributed throughout the paper substrate. If $Q_{total}$ is 01 greater than 0.5, then there is more sizing agent towards the central portion (measured by the z-direction normal to the plane of the substrate) of the paper substrate than towards the paper substrate's surface or surfaces. If $Q_{total}$ is less than 0.5, then there is less composition towards the central portion of the paper substrate than towards the paper substrate's surface or surfaces. In light of the above, the paper substrate preferably has a $Q_{total}$ that is less than 0.5, preferably less than 0.4, more preferably less than 0.3, most preferably less than 0.25. Accordingly the $Q_{total}$ of the paper substrate may be from 0 to less than 0.5. This range includes 0, 0.001, 0.002, 0.005, 0.01, 0.02, 0.05, 0.1, 0.15, 0.2, 0.25, 0.3, 0.35, 0.4, 0.45, and 0.49, including any and all ranges and subranges therein.

The recording sheet may be suitably printed by generating images on a surface thereof using conventional printing processes and apparatus as for example laser, ink jet, EP, liquid toner EP, offset, and flexo printing processes and apparatus. In this method, the recording sheet is incorporated into a printing apparatus; and an image is formed on a surface of the sheet. The recording sheet can also be used in any other printing or imaging process, such as printing with pen plotters, printers, copiers, fax machines, and handwriting with ink pens.

The recording sheets desirably exhibit good print density. Print density may be measured using a reflectance densitometer (X-Rite, Macbeth. Etc.) in units of optical density ("OD"). The method involves printing a solid block of color on the sheet, and measuring the optical density. There may be some variation in OD depending on the particular printer used and the print mode chosen, as well as the densitometer mode and color setting. The printer is not particularly limited and may be, for example, an HP Deskjet 5550 printer, an HP Deskjet 6122, manufactured by Hewlett-Packard, which uses a #45 (HP product number 51645A) black ink jet cartridge, or a Canon i470D inkjet printer. The print mode is determined by the type of paper and the print quality selected. The default setting of Plain Paper type and Fast Normal print quality print mode may be suitably selected. A suitable densitometer may be an X-Rite model 528 spectrodensitometer with a 6 mm aperture. The density measurement settings may suitably be Visual color, status T, and absolute density mode. In one embodiment, the target optical density for pigment black ("$OD_O$") is equal to or greater than about 1.30 in the standard (plain paper, normal) print mode for the HP desktop ink jet printers that use the most common black pigment ink (equivalent to the #45 ink jet cartridge). When measured using black pigment ink, this includes all ranges and subranges therebetween, including an $OD_O$ equal to or greater than about 1.30, 1.40, 1.50, 1.60, 1.70, 1.80, and 1.90.

The relevant contents of each of U.S. Provisional Patent Application 60/759,629, filed Jan. 17, 2006; U.S. Provisional Patent Application 60/853,882, filed Oct. 24, 2006; U.S. Provisional Patent Application 60/759,630, filed Jan. 17, 2006; U.S. patent application Ser. No. 10/662,699, filed Sep. 15, 2003, and published Apr. 8, 2004, as U.S. Patent Application Publication No. 2004/0065423; U.S. patent application Ser. No. 11/655,004, filed Jan. 17, 2007, and published Feb. 14, 2008, as U.S. Patent Application Publication No. 2008/0035292 are independently incorporated herein by reference.

The entire contents of U.S. Pat. Nos. 4,427,836, 5,157,084, and U.S. Published Application 20080311416, EP364629, and WO2006026283, WO2008156519, and WO2008067444 are incorporated herein by reference.

The entire contents of "Handbook for Pulp and Paper Technologists" by G. A. Smook (1992) Angus Wilde Publications, is incorporated herein by reference.

As used throughout, ranges are used as a short hand for describing each and every value that is within the range, including all subranges therein.

All of the references, as well as their cited references, cited herein are hereby incorporated by reference with respect to relative portions related to the subject matter of the present invention and all of its embodiments.

Numerous modifications and variations on the present invention are possible in light of the above teachings. It is, therefore, to be understood that within the scope of the accompanying claims, the invention may be practiced otherwise than as specifically described herein.

What is claimed is:

1. A water-absorbent, dye-fixing core/shell particle, comprising:
    a water-absorbent, dye-fixing polymeric core, comprising:
        (a) a multivalent cation and a polymerization product of a homopolymer of a monoethylenically unsaturated carbonyl-group containing monomer; or
        (b) a combination of (a) and a nitrogen-containing polymer; and
    a water-insoluble, porous polymeric outer shell, surrounding all or a portion of said core;
    wherein when the carbonyl-group containing monomer is a carboxylic acid-containing monomer, a proportion of carboxylic-acid-containing monomer in the polymeric shell is less than or equal to one-third of a proportion of the carboxylic acid-containing monomer in the polymerization product, and
    wherein the entire shell is porous.

2. The core/shell particle of claim 1, wherein the polymerization product is an emulsion polymerization product.

3. The core/shell particle of claim 1, wherein the multivalent cation comprises one or more of calcium, aluminum, zirconium, zinc, titanium, magnesium, barium, water soluble salt thereof, or combination thereof.

4. The core/shell particle of claim 1, wherein (a) comprises a salt of the multivalent cation and the polymerization product.

5. The core/shell particle of claim 1, wherein (a) comprises a water-soluble salt of the multivalent cation and the polymerization product.

6. The core/shell particle of claim 1, wherein the nitrogen-containing polymer comprises a polyvinylpyridine, polyalkylaminoethyl acrylate, polyalkylaminoethyl methacrylate, poly(vinyl imidazole), polyethyleneimine, polybiguanide, polyguanide, poly(hexamethylene)biguanide, polyvinylamine, polydiallyldimethylammonium chloride, polydicyanoguanide, polyallylamine, polyacrylamine, polyacrylamide, polyquaternaryamine, cationic polyurethane, aminocellulose, polysaccharide amine, or combination thereof.

7. The core/shell particle of claim 1, wherein the carboxylic acid-containing monomer is acrylic acid, methacrylic acid, (meth)acryloxypropionic acid, itaconic acid, aconitic acid, maleic acid, fumaric acid, crotonic acid, monomethyl maleate, monomethyl fumarate, acryloxyacetic acid, methacryloxyacetic acid, or monomethyl itaconate.

8. The core/shell particle of claim 1, wherein the carbonyl-group containing monomer is vinyl acetate, acrylonitrile, (meth)acrylamide, ($C_1$-$C_{20}$)alkyl or ($C_3$-$C_{20}$)alkenyl ester of (meth)acrylic acid, methyl methacrylate, methyl acrylate, ethyl(meth)acrylate, butyl(meth)acrylate, 2-ethylhexyl (meth)acrylate, benzyl(meth)acrylate, lauryl(meth)acrylate, oleyl(meth)acrylate, palmityl(meth)acrylate, or stearyl (meth)acrylate.

9. The core/shell particle of claim 1, wherein the polymeric shell comprises a polymerization product of one or more nonionic monoethylenically unsaturated monomers selected from the group consisting of styrene, α-methyl styrene, vinyl-toluene, ethylene, vinyl acetate, vinyl chloride, vinylidene chloride, acrylonitrile, (meth)acrylamide, ($C_1$-$C_{20}$)alkyl or ($C_3$-$C_{20}$)alkenyl ester of (meth)acrylic acid, methyl methacrylate, methyl acrylate, ethyl(meth)acrylate, butyl(meth) acrylate, 2-ethylhexyl(meth)acrylate, benzyl(meth)acrylate, lauryl(meth)acrylate, oleyl(meth)acrylate, palmityl(meth) acrylate, stearyl(meth)acrylate, acrylic acid, methacrylic acid, (meth)acryloxypropionic acid, itaconic acid, aconitic acid, maleic acid, fumaric acid, crotonic acid, monomethyl maleate, monomethyl fumarate, acryloxyacetic acid, methacryloxyacetic acid, monomethyl itaconate, or combination thereof.

10. A sizing or coating composition, comprising:
    the core/shell particle of claim 1,
    a binder resin; and
    a carrier liquid.

* * * * *